US00RE37521E

(19) United States
(12) Reissued Patent
Laurash et al.

(10) Patent Number: US RE37,521 E
(45) Date of Reissued Patent: Jan. 22, 2002

(54) MULTIPURPOSE TUCK LABEL/FORM

(75) Inventors: David F. Laurash, Bellbrook, OH (US); George T. Taylor, Bellevue, WA (US)

(73) Assignee: The Standard Register Company, Dayton, OH (US)

(21) Appl. No.: 08/744,432

(22) Filed: Nov. 8, 1996

Related U.S. Patent Documents

Reissue of:
(64) Patent No.: 5,413,383
Issued: May 9, 1995
Appl. No.: 08/118,149
Filed: Sep. 8, 1993

(51) Int. Cl.[7] ..... B42D 15/00
(52) U.S. Cl. ..... 283/79; 229/68.1; 229/300; 283/81; 428/40.1; 428/43; 462/6; 462/900
(58) Field of Search ..... 283/79, 81, 116; 229/68.1, 307, 74, 300; 428/40.1, 43, 194; 503/200, 206, 226; 462/6, 900, 18, 22, 24

(56) References Cited

U.S. PATENT DOCUMENTS

| | | | | |
|---|---|---|---|---|
| 202,874 | A | * | 4/1878 | Rogers |
| 1,424,837 | A | * | 8/1922 | Lover |
| 1,479,280 | A | * | 1/1924 | Brown |
| 2,112,227 | A | * | 3/1938 | Berkowitz |
| 2,678,769 | A | * | 5/1954 | David |
| 2,887,327 | A | * | 5/1959 | Tucker |
| 3,537,637 | A | * | 11/1970 | Hiersteiner |
| 3,863,836 | A | * | 2/1975 | Austin |
| 4,614,361 | A | * | 9/1986 | Foster |
| 4,682,793 | A | * | 7/1987 | Walz ..... 462/2 |
| 4,688,826 | A | * | 8/1987 | Hosoya |
| 4,762,342 | A | * | 8/1988 | Thompson ..... 462/18 X |
| 4,762,642 | A | * | 8/1988 | Thompson |
| 4,799,712 | A | * | 1/1989 | Biava et al. |
| 4,824,142 | A | * | 4/1989 | Dossche |
| 4,854,610 | A | * | 8/1989 | Kwiatek |
| 4,927,179 | A | * | 5/1990 | Ehret et al. |
| 4,938,507 | A | * | 7/1990 | Ahsby et al. |
| 4,968,547 | A | * | 11/1990 | McCarthy et al. |
| 4,978,146 | A | * | 12/1990 | Warther et al. |
| 4,995,642 | A | * | 2/1991 | Juszak et al. |
| 5,031,939 | A | * | 7/1991 | Webendorfer et al. |
| 5,071,167 | A | * | 12/1991 | O'Brien |
| 5,071,467 | A | * | 12/1991 | O'Brien |
| 5,190,210 | A | * | 3/1993 | Walz |
| 5,238,272 | A | * | 8/1993 | Taylor ..... 283/79 |
| 5,267,898 | A | * | 12/1993 | Doll et al. |
| 5,299,979 | A | * | 4/1994 | Ballard |

FOREIGN PATENT DOCUMENTS

| | | | |
|---|---|---|---|
| AU | 56460 | * | 12/1974 |
| CA | 1116137 | * | 1/1982 |
| FR | 2337627 | * | 8/1977 |
| FR | 2427195 | * | 12/1979 |

* cited by examiner

*Primary Examiner*—A. L. Wellington
*Assistant Examiner*—Monica S. Carter
(74) *Attorney, Agent, or Firm*—Killworth, Gottman, Hagan & Schaeff, LLP

(57) ABSTRACT

A single multipurpose tuck label/form is provided and is imprinted with only a single pass of a printer. The multipurpose tuck label/form includes a label ply and a liner ply, both having respective first and second sides. The first side of the liner ply contacts the second side of the label ply and includes a release coating thereon. Through a unique placement of the release coating on the liner ply and pattern-coated adhesive on the label ply, the tuck label/form can be imprinted in a single pass through a computer-driven printer and may be used without the need for any die cuts to be made on the liner ply.

26 Claims, 7 Drawing Sheets

MULTIPURPOSE TUCK LABEL/FORM

Matter enclosed in heavy brackets [ ] appears in the original patent but forms no part of this reissue specification; matter printed in italics indicates the additions made by reissue.

BACKGROUND OF THE INVENTION

This invention relates to a multipurpose label or business form, and more particularly to a tuck label adapted to be adhered to a substrate such as an envelope or package.

Commercial businesses who supply goods based on customer orders require a substantial amount of information about an order to be generated so that the persons taking the order, filling the order, shipping the order, billing the order, etc. can perform their jobs and insure that the goods reach the proper customer promptly. In the past, multiple pieces of printed paper have been generated either by hand, typewriter, or computer-driven printer and include such things as invoices, shipping labels, customer receipts, common carrier tracking labels, warehouse picking lists, bills of lading, and returned goods forms. Typically, multiple operations have been needed to generate all of those documents and labels. The time, labor, and paper needed to generate all of these items represents a significant cost to a business.

Some attempts have been made to combine two or more of the above forms into a single form or label. Webendorfer et al, U.S. Pat. No. 5,031,939, show a composite shipping label and price tag form. The form includes a pair of side-by-side shipping labels each having a plurality of price tags associated therewith. The price tags are designed to be tucked behind the shipping label which is then secured to the exterior of a package. Upon arrival at a destination, a portion of the shipping label is torn off along perforation lines, and the price tags are removed and placed on items carried in the package. However, the Webendorfer et al composite form is complex to manufacture, requiring die cuts to be made on both the label and release liner plies of the form.

O'Brien, U.S. Pat. No. 5,071,167, shows a combination shipping and return label including an intermediate card connecting the shipping and return portions of the label. The shipping portion of the label includes bands of peripheral adhesive. However, the O'Brien label requires that the return shipping label be affixed first to the package with the remainder of the label assembly then Z-folded over it. Care must be taken to precisely position the peripheral adhesive so that it does not overlap the remaining portions of the label.

Accordingly, there remains a need in this art for a simplified operation which can produce a combination label or business form which provides all of the necessary documentation and yet which can be generated in a single pass through a printing device.

SUMMARY OF THE INVENTION

The present invention meets that need by providing a single multipurpose tuck label/form which replaces the multiple documents of the prior art and which is imprinted with only a single pass of a printer. In accordance with one aspect of the invention, a multipurpose tuck label/form is provided and includes a label ply and a liner ply, both having respective first and second sides. The first side of the liner ply contacts the second side of the label ply and includes a release coating thereon. Through a unique placement of the release coating on the liner ply and pattern-coated adhesive on the label ply, the tuck label/form can be imprinted in a single pass through a computer-driven printer and can be utilized without the need for any die cuts to be made on the liner ply. This greatly simplifies not only the construction of the label/form, but also greatly reduces the amount of paper needed for the multiple end uses to which the construction is put.

In one embodiment, the label ply includes an upper panel, a center panel, a lower panel, and a pair of side panels, with the upper and center panels being connected along a transverse perforated fold line. The upper panel is adapted to be folded along the fold line so that the second side of the upper panel is in contact with the second side of the center panel to tuck the upper panel behind the center panel when the label is adhered to a substrate.

The center panel is connected to the lower panel and to respective side panels along generally transverse and vertical lines of perforation such that the center and upper panels may be removed from the label by tearing along those lines of perforation. The lower and side panels include an adhesive on the respective second sides thereof which are used to adhere the form/label to a substrate after it has been peeled away from the liner ply. Preferably, the adhesive is a pressure sensitive adhesive (either permanent or removable). To aid in peeling the label and liner plies apart, an adhesive-free clean lifting edge on the label ply may be provided for removing the label ply from the liner ply.

To insure that the tucked upper ply is secure and remains in its tucked position, an adhesive may be positioned adjacent to the upper edge of the second side of the upper panel. In this manner, the upper edge of the upper panel is secured to the second side of the second panel until the upper and center panels are removed from the remainder of the label by tearing at the perforations along the edges of the center panel. The adhesive used may be a removable pressure sensitive adhesive, which typically will be the same pressure sensitive adhesive as that used to coat the undersides of the lower and side panels.

In another embodiment of the invention, the label ply includes an additional portion carried on the liner ply adjacent to the remainder of the label ply but separated therefrom by one or more die cuts. This additional label ply portion may be imprinted with additional information which can form an office or record copy of certain information. This additional portion, separated from the remainder of the label ply by die cuts, can then be peeled away from the liner ply and be used or stored as needed.

In yet another embodiment of the invention, a self-contained carbonless imaging coating may be placed on the first side of the liner ply. This embodiment of the invention is preferably used when the tuck label/form is imaged by an impact printing device such as a computer-driven dot matrix printer or a typewriter. Upon the application of an imaging force on the label ply, a duplicate image is formed on the liner ply which can then be used as an office or record copy. Also, coated front (CB) and coated back (CF) carbonless imaging coatings may be positioned on the second side of the label ply and the first side of the liner ply, respectively, such that upon the application of an imaging force, the coatings combine and an image is formed on the liner ply.

In another embodiment of the invention, a multipurpose tuck label/form is provided and includes a label ply and a liner ply, both having respective first and second sides. The first side of the liner ply contacts the second side of the label ply and includes a release coating thereon. The label ply includes an upper panel, a center panel having upper and lower portions connected along a transverse line of perforations, a lower panel, and a pair of side panels.

The upper and center panels are connected to one another along a transverse line of perforations, with the center panel being connected to the lower panel and to respective side panels along generally transverse and vertical lines of perforation such that the center and upper panels may be removed from the label by tearing along those perforations. The second side of the lower panel includes a release coating thereon, and the upper and side panels include an adhesive on the respective second sides thereof. Preferably, the adhesive is a pressure sensitive adhesive (either permanent or removable). To aid in peeling the label and liner plies apart, an adhesive-free clean lifting edge on the label ply may be provided for removing the label ply from the liner ply.

The upper panel and upper portion of the center panel are adapted to be folded along the transverse line or perforations between the two portions of the center panel so that the second side of the upper panel is in contact with the second side of the lower panel having the release coating and the upper portion of the center panel is in contact with the lower portion of the center panel, respectively. In this manner, after the panels are removed from the label by tearing along the lines of perforation, the upper panel may be easily removed from the lower panel.

As with previous embodiments of the invention, the label ply may include an additional portion carried on the liner ply adjacent to the remainder of the label ply but separated therefrom by one or more die cuts. This additional label ply portion may be imprinted with additional information which can form an office or record copy of certain information. This additional portion, separated from the remainder of the label ply by die cuts, can then be peeled away from the liner ply and be used or stored as needed. Also, as with previous embodiments of the invention, a self-contained or CF/CB carbonless imaging coatings(s) may be used when the tuck label/form is imaged by an impact printing device such as a computer-driven dot matrix printer or a type-writer.

In a preferred form of this embodiment, the lower portion of the center panel includes a die cut tab adjacent the upper portion of the center panel. It is preferred that there also be adhesive on a second side of the die cut tab to permit the tab to secure the tuck label against a substrate such as an envelope or package surface. Optionally, a generally transverse line of perforation may connect the die cut tab to the lower portion of the center panel to permit ready removal of the tab to face the panels from the remainder of the label.

The multipurpose tuck label/form of the present invention may be used as a multipart label for shipping goods to a customer. Thus, an address may be printed the first side of the lower portion of the center panel and a shipper's bar code printed on the first side of the lower panel. A customer receipt may be printed on the first side of the upper portion of the center panel and a return shipping label printed on the first side of the upper panel. In use, the label is peeled away from the liner ply and the adhesive carried on the side and/or lower panels is used to secure it to a surface of a package or envelope.

Accordingly, it is a feature of the present invention to provide a single multipurpose tuck label/form which replaces the multiple documents of the prior art and which is imprinted with only a single pass of a printer. This, and other features and advantages of the present invention will become apparent from the following detailed description, the accompanying drawings, and the appended claims.

DETAILED DESCRIPTION OF THE PREFERRED EMBODIMENTS

Figure 1:
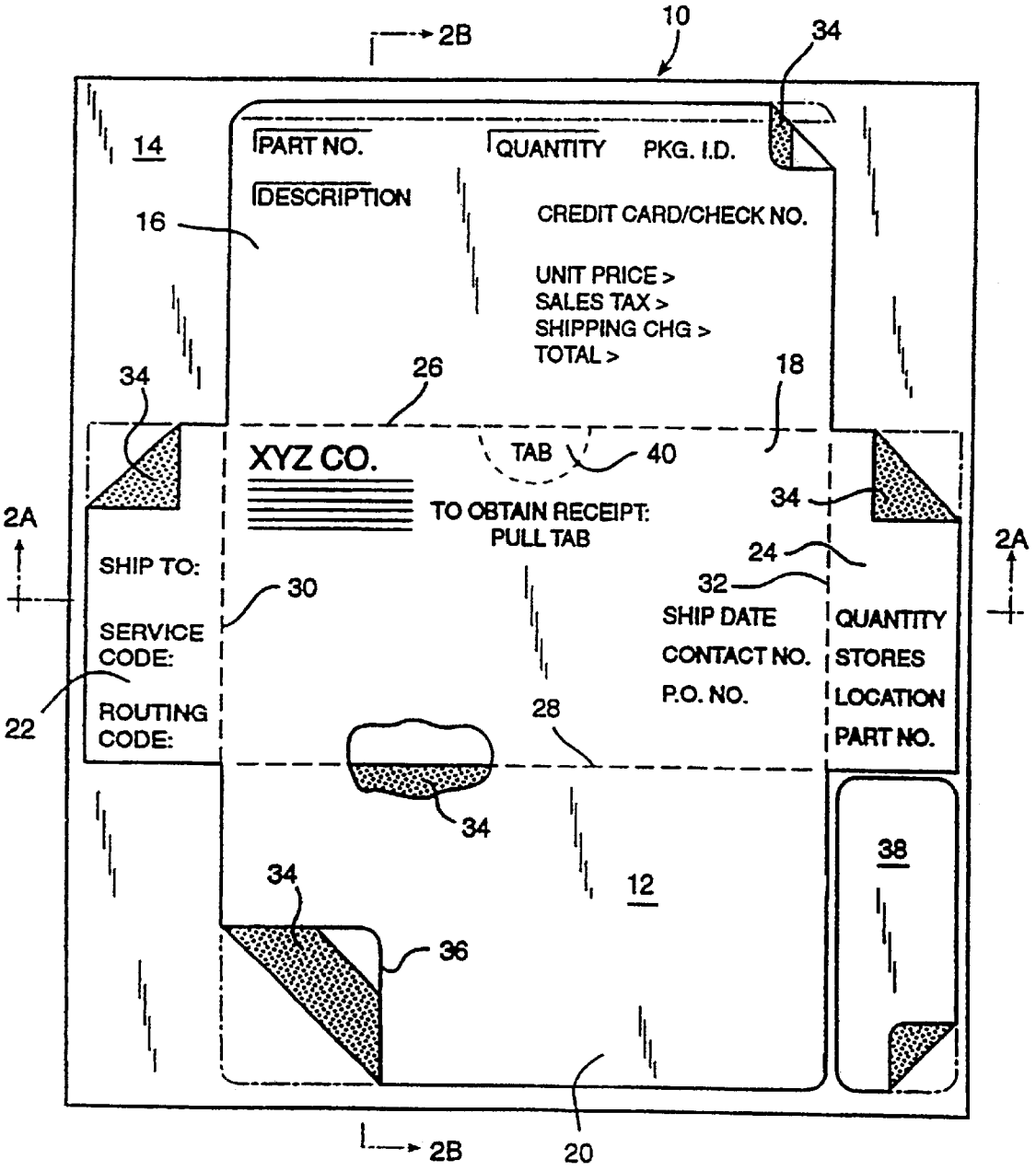
FIG. 1 is a plan view of the front side of one embodiment of the multipurpose tuck label of the present invention.
Figure 2A:
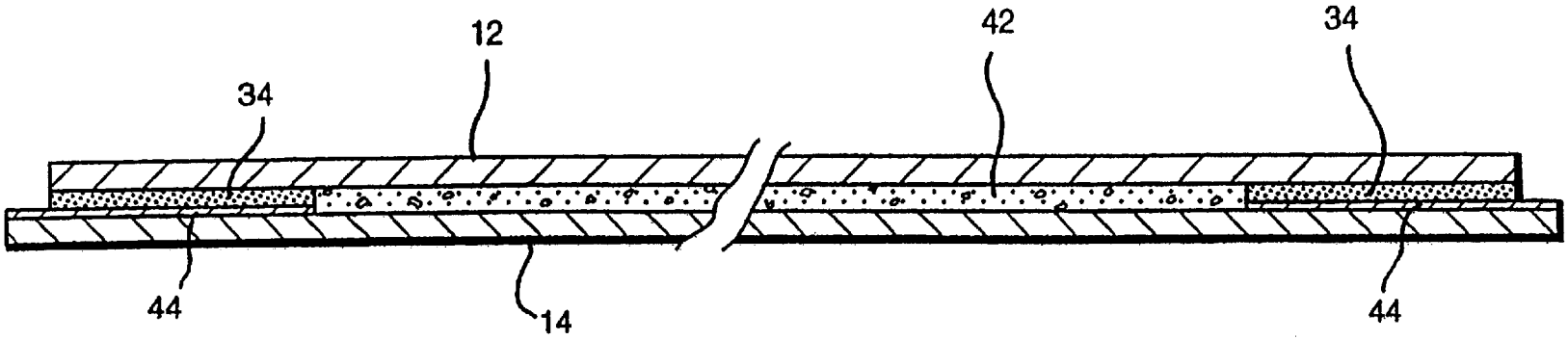
FIGS. 2A and 2B are enlarged sectional views taken along lines 2A—2A and 2B—2B, respectively, in FIG. 1.
Figure 2B:
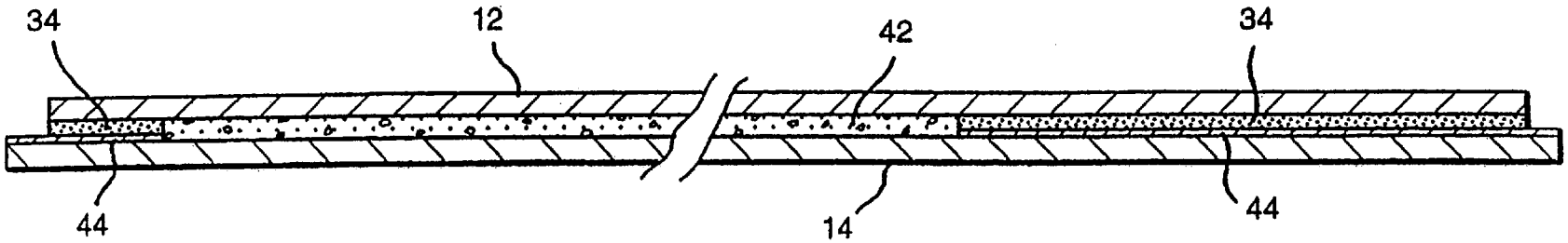

The present invention relates to a multipurpose tuck label or business form which can be printed with all necessary information in a single pass through a printing device. Although the label/form can be used for a variety of end uses, the invention will be explained with reference to preferred embodiments in which the label construction performs the functions of a shipping label, invoice, customer receipt, common carrier tracking label, warehouse picking list, and returned goods label. Referring now to FIGS. 1, 2A, and 2B, a first embodiment of the multipurpose tuck label 10 of the present invention is shown. Tuck label 10 includes a label ply 12 and a liner ply 14, both having first and second sides. The first side of liner ply 14 (facing upward in FIG. 1) includes a release surface which may be formed by coating the surface of liner ply 14 which faces the second side of the label ply 12 with any conventional release material. The coating may extend over the entire surface of the liner ply, or may include only selective areas corresponding to the placement of pressure sensitive adhesive on the label ply. Alternatively, liner ply 14 may itself be formed of a release material.

Label ply 12 includes an upper panel 16, a center panel 18, a lower panel 20, and a pair of side panels 22, 24. Label ply 16 may be made from paper, coated paper, plastic film, or paper and plastic laminated materials. The selection of the material forming the label ply is generally dependent upon desired end use for the label and the type of printer to be used. As shown, upper panel 16 and center panel 18 are connected along a transverse line of perforations 26. Upper panel 16 is adapted to be folded along the line of perforations 26 against the second surface of center panel 18 so that upper panel 16 is tucked behind center panel 18 when the label 10 is secured to a substrate such as a package or shipping container.

Upper panel 16 may include both variable and nonvariable information printed thereon and, in the embodiment illustrated, serves as a customer receipt which identifies the item purchased and its price. The nonvariable information may be preprinted by the manufacturer of label 10 prior to sale to a customer and may include generic designations such as "Part No.", "Quantity", and the like as shown. It will be appreciated by those skilled in this art that the preprinted information will change depending upon the desired end use by a customer and the specific categories of information required by that customer.

Variable information identifying a specific purchaser name and order number may be printed in a single pass through a computer-controlled printer. Suitable printing devices include noncontact printers such as laser and thermal printers, or contact printers such as dot matrix printers. While illustrated as a single sheet, label 10 is preferably manufactured using continuous label and liner webs which are coated in predetermined areas with adhesive and release material and then joined together. Individual labels are then formed by die cutting only the label ply, removing the selvage or matrix material, perforating the liner ply between labels, and then Z-folding the continuous web to form a connected stack of labels. Depending upon the printing device selected, the continuous web of labels may include marginal prepunched holes to guide the form through the printing device. If a sheet-fed printer is to be used, the continuous web may be cut into individual label/form sheets, and the sheets stacked.

In the embodiment illustrated, center panel 18 serves as a shipping label identifying the customer's shipping address, the ship date, as well as providing a return address. Lower panel 20 can serve a number of uses including displaying a common carrier tracking code such as a bar code (not shown in FIG. 1, but shown in the embodiment illustrated in FIG. 6). Side panels 22, 24 may also include both variable and nonvariable printed information relating to the order, customer, location, quantity, etc. Such information may be used internally by the shipper to locate inventory and fill the order from a warehouse or other shipping facility.

Center panel 18 is connected to lower panel 20 and to respective side panels 22, 24 along generally transverse and vertical lines of perforation 28, 30, and 32, respectively. The tucked upper and center panels are designed to be removed from the remainder of label 10 by the recipient of the package by grasping and pulling tab 40 and tearing along lines of perforation 28, 30, and 32. Once removed from the remainder of the label construction, panel 16 acts as a receipt for the customer. Lower panel 20 and side panels 24, 24 include an adhesive 34 which secures label ply 12 to liner ply 14 or to another surface. Adhesive 34 is preferably a permanent or removable pressure sensitive adhesive, although a hot melt adhesive or a remoistenable adhesive may be used. In the latter instances, where hot melt or remoistenable adhesives are used, there is no need for the liner ply. Such adhesives are known in the art and readily commercially available. As shown, the coating of adhesive 34 extends on the respective side and lower panels up to lines of perforation 28, 30, and 32. As an aid in removing label ply 12 from liner ply 14, an edge 36 of lower panel 20 is free of adhesive 34 to provide an easily grasped clean-lifting edge. While illustrated as continuous, full coatings of adhesive 34, it will be appreciated that the adhesive may be spot or pattern coated as well.

To insure that upper panel 16 remains protected in its tucked position, a thin line of adhesive 34 may be positioned adjacent the upper edge of the panel. When folded, the line of adhesive 34 secures upper panel 16 against the second side of center panel 18. Adhesive 34 is typically the same adhesive as is used on other locations of the label/form.

As also shown in FIG. 1, label 10 may optionally include an additional label portion 38 which is carried on liner ply 14 by an adhesive, but which is separated from the retainer of label ply 12 by die cuts. This additional label ply portion 38 may be imprinted with additional or duplicate information which can be used by the shipper internally as an office or record copy of the order. Portion 38 may be peeled from liner 14 and used or stored as needed.

As shown in FIGS. 2A and 2B, an optional self-contained carbonless imaging coating 42 may be placed on the first side of liner ply 14 in an area which has not been coated with release material 44. This particular version of the invention may be used when the tuck label/form is imaged by an impact printing device such as a dot matrix printer or typewriter. Application of an imaging force on label ply 12 causes a duplicate image to be formed on the first surface of liner ply 14. Thus, liner ply 14 may be used as a record or duplicate office copy of the information printed onto label ply 12.

Self-contained coating 42 may be a full coating over substantially the entire first side of liner ply 12 or may be spot coated only on predetermined areas. Further, coated front (CF) and coated back (CB) carbonless imaging coatings may be applied, respectively, to the first side of liner ply 14 and the second side of label-ply 12 to achieve the same result. In that instance, the coating of release material on the first side of liner ply 14 should be applied only to selective areas outside the carbonless coated areas so as not to interfere with the carbonless images which are formed.

Figure 4:
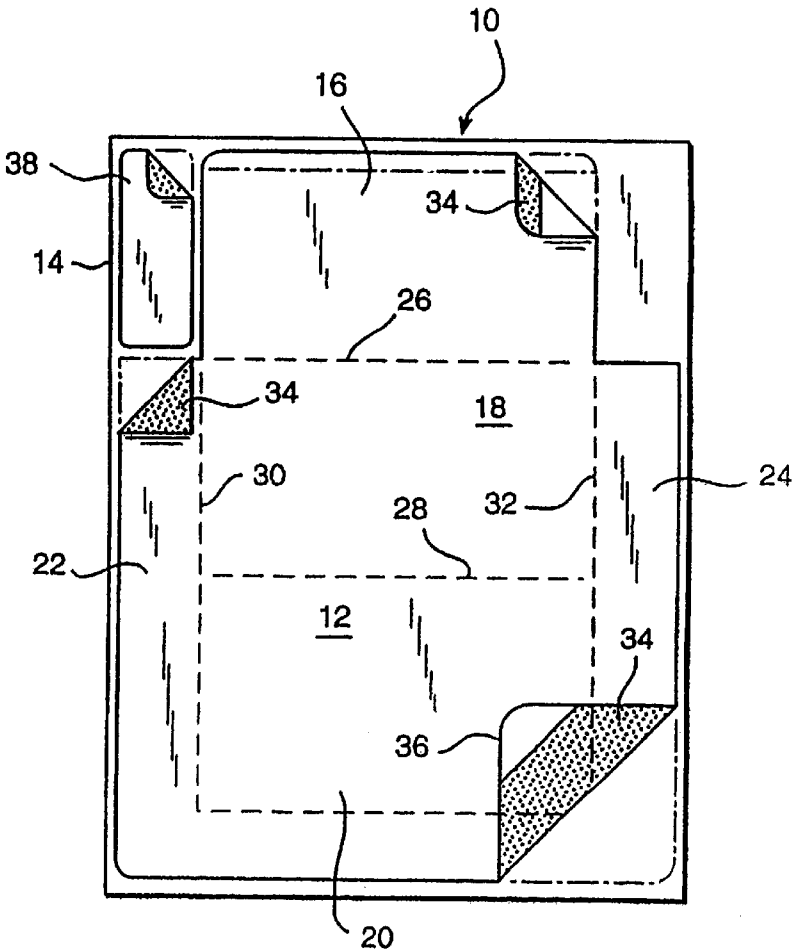
FIG. 4 is a plan view of the front side of a further modification of the version of the multipurpose tuck label of FIG. 3.
Figure 3:
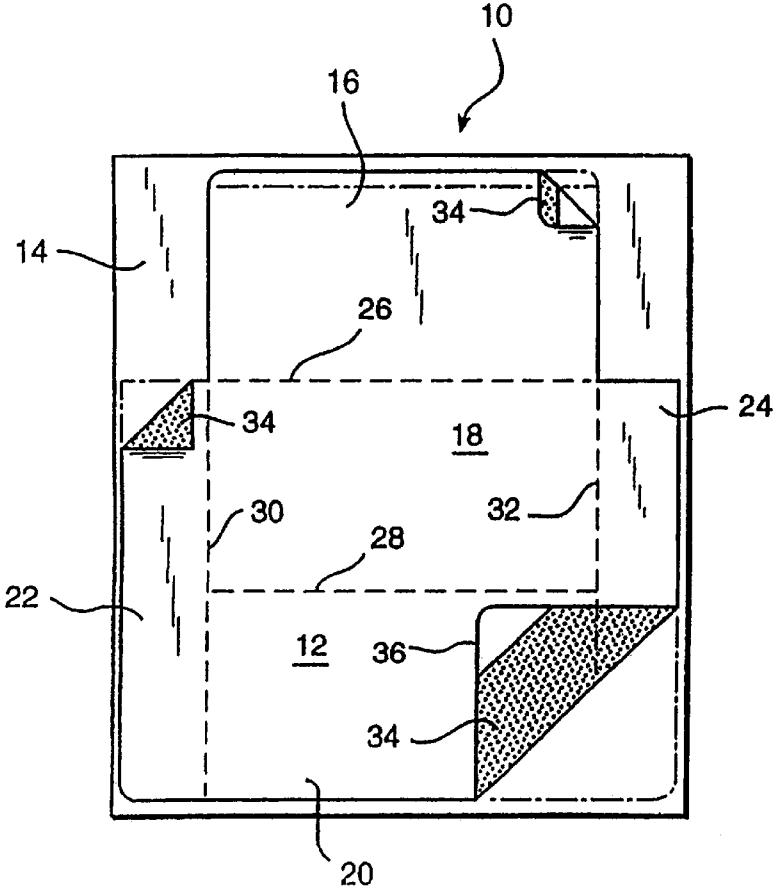
FIG. 3 is a plan view of the front side of another version of the embodiment of the multipurpose tuck label illustrated in FIG. 1.
Figure 5:
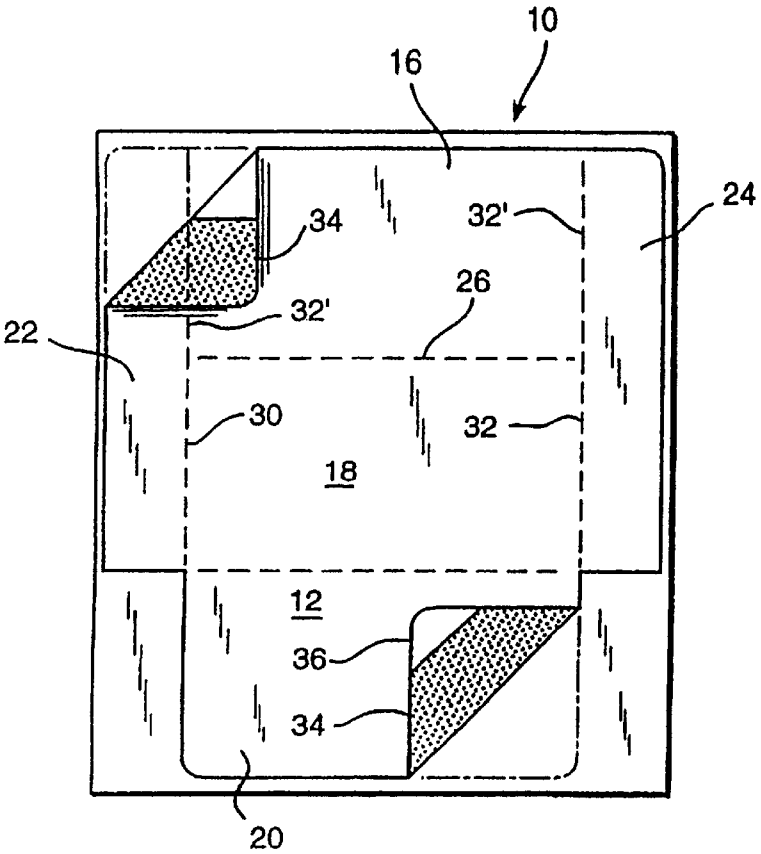
FIG. 5 is a plan view of the front side of another version of the embodiment of the multipurpose tuck label illustrated in FIGS. 1, 3, and 4.
Figure 7A:
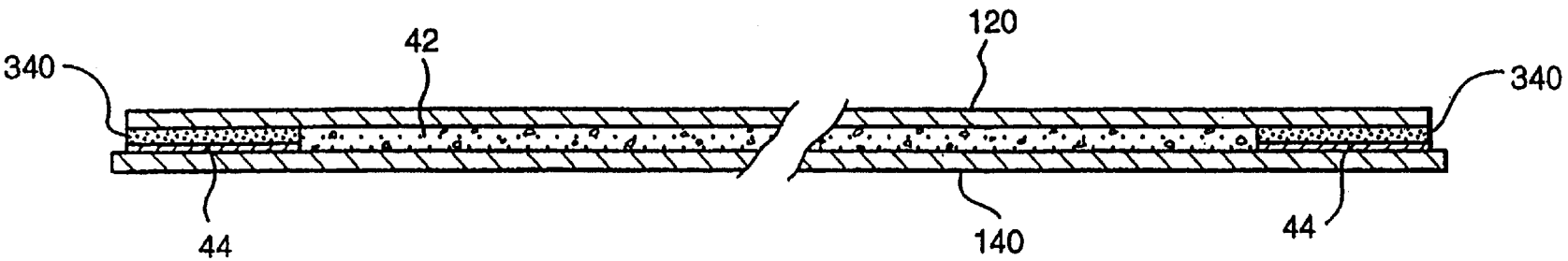
FIGS. 7A and 7B are enlarged sectional views taken along lines 7A—7A and 7B—7B in FIG. 6.
Figure 7B:
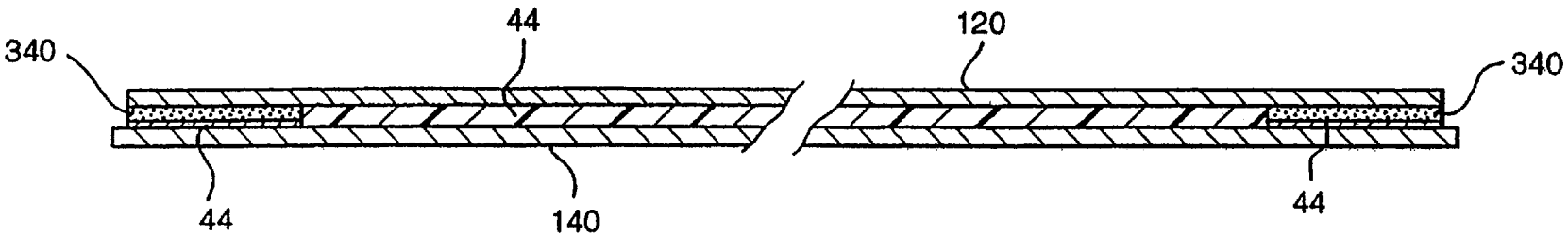

Variations on the construction and configurations of tuck label 10 are illustrated in FIGS. 3, 4, and 5, where like reference numerals represent like elements. In the version of tuck label 10 illustrated in FIG. 3, side panels 22 and 24 have been extended downwardly to extend along lower panel 20. In the version of tuck label 10 illustrated in FIG. 4, side panels 22 and 24 have been extended downwardly to extend along lower panel 20, and around and below lower panel 20, as shown by the area between the brackets, to provide a greater area of adhesive for securing the label to a package.

In the FIG. 4 version, a U-shaped peripheral area of adhesive coated onto the second side of side panels 22, 24 and an extension under lower panel 20 is used to secure the tuck label 10 to a substrate. As can be seen, space remains on the label construction to position optional portion 38 in a location adjacent to either end of upper panel 16. In the version illustrated in FIG. 5, side panels 22 and 24 have been extended upwardly along upper panel 16 and are connected thereto along lines of perforations 30' and 32' In this version of the invention, upper panel 16 is torn along these vertical lines of perforations 30', 32' down to the transverse line of perforations 26 connecting the upper panel with center panel 18. Then, upper panel 16 is folded under center panel 18 prior to adhering the label ply 12 to a substrate.

Figure 6:
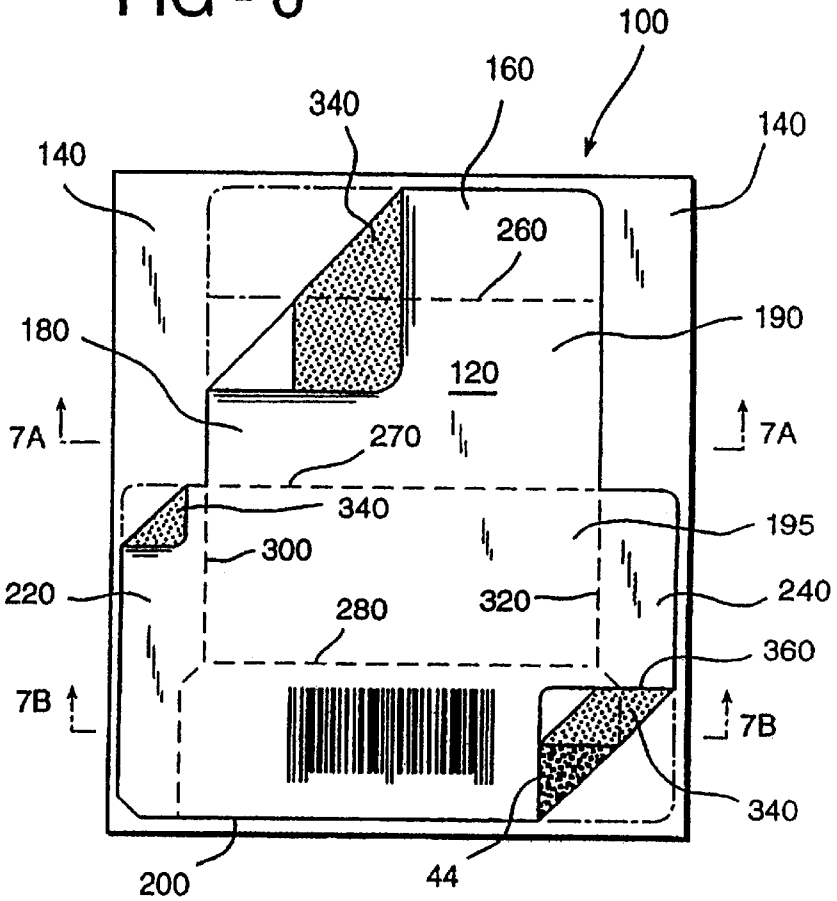
FIG. 6 is a plan view of the front side of a second embodiment of the multipurpose tuck label of the present invention.

A second embodiment of the tuck label/form of the present invention is illustrated in FIGS. 6–12. The materials of construction of the label and liner plies as well as the adhesives used are the same as for the first embodiment of the invention. As shown in FIG. 6, tuck label 100 includes a label ply 120 and a liner ply 140, both having first and second sides. As in the first embodiment of the invention, the first side of liner ply 140 (facing upward in FIG. 6) includes a release surface which may be formed by coating the surface of liner ply 140 which faces the second side of the label ply 120 with any conventional release material. Also, as best shown in FIG. 7B, the second side of lower panel 200 also includes a release surface which includes a coating of a release material 44.

Label ply 120 includes an upper panel 160, a center panel 180, having upper and lower portions, 190 and 195, respectively, a lower panel 200, and a pair of side panels 220 and 240. As shown, upper panel 160 and the upper portion 190 of center panel 180 are connected along a transverse line of perforations 260. Likewise, the respective upper and lower portions 190, 195 of center panel 180 are connected along a transverse line of perforations 270, while the lower portion 195 of center panel 180 is connected to lower panel 200 along a transverse line of perforations 280.

As in the first embodiment of the invention, side panels 220 and 240 are connected to the center and lower panels 180, 200 along vertical lines of perforations 300, 320. Upper panel 160 and the upper portion 190 of center panel 180 are adapted to be folded along line of perforations 270 against the second side of lower panel 200 and lower portion 195 of center panel 180, respectively. The adhesive on the second side of upper panel 160 will mate and secure that panel to the second side of lower panel 200 which has a release coating thereon. In this manner, upper panel 160 can later be separated from lower panel 200 as will be explained in greater detail below.

Figure 8:
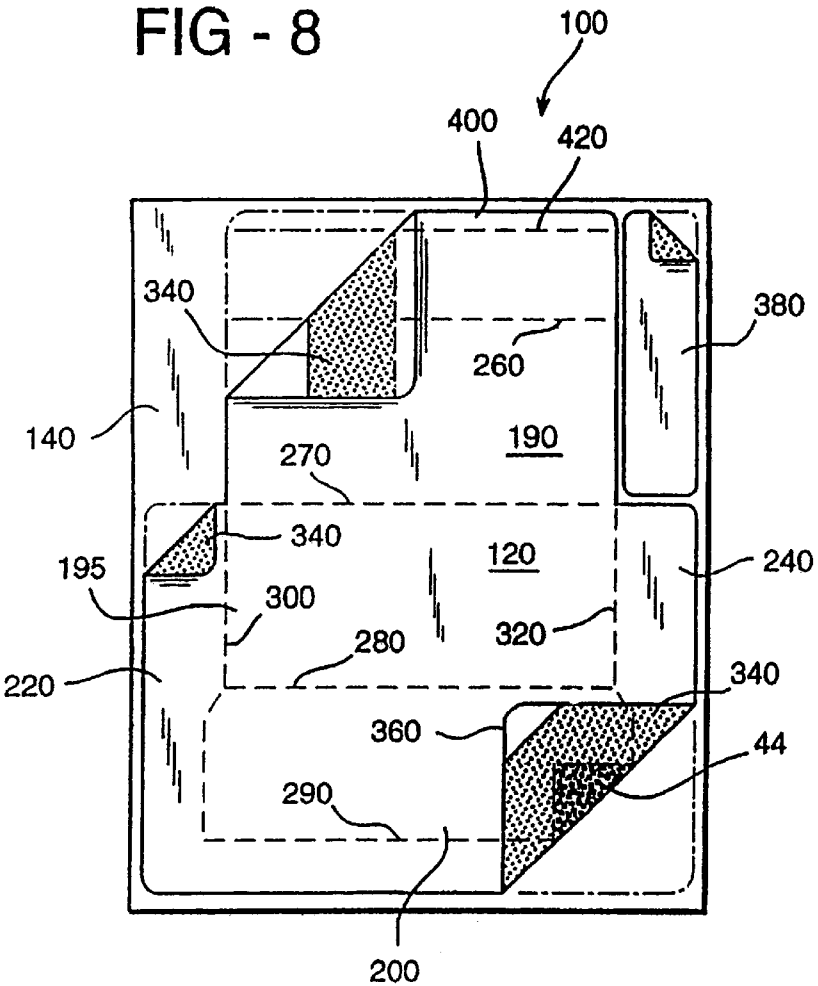
FIG. 8 is a plan view of the front side of another version of the embodiment of the multipurpose tuck label illustrated in FIG. 6.

As in the previous embodiment of the invention, label ply 120 may also optionally include an additional label portion 380 which is carried on liner ply 140 by an adhesive, but which is separated from the remainder of label ply 120 by die cuts. Such an optional portion is shown in FIG. 8. This additional label ply portion 380 may be imprinted with additional or duplicate information which can be used by the shipper internally as an office or record copy of the order. Portion 380 may be peeled from liner 14 and used or stored as needed. Also as with the previous embodiment of the invention, a self-contained or CF/CB carbonless imaging system may be used when the tuck label is designed to be used in an impact printing device.

Figure 9:
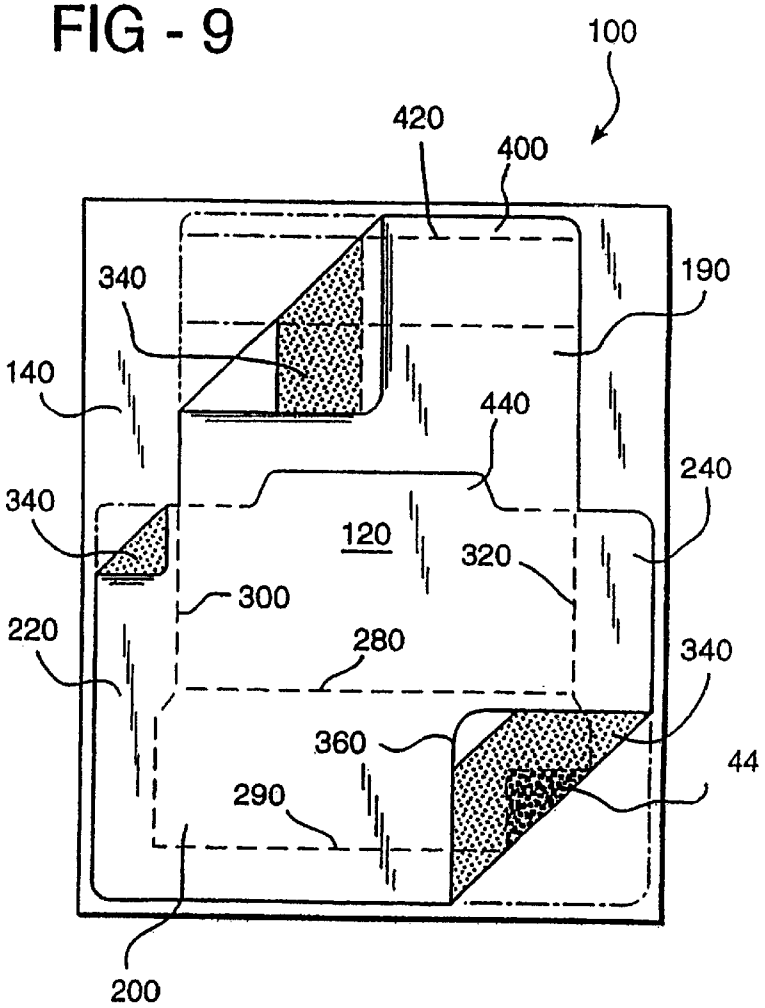
FIG. 9 is a plan view of the front side of a further modification of the embodiment of the multipurpose tuck label illustrated in FIG. 8.

Again, variations on the construction of tuck label 100 are possible. Certain variations are shown in FIGS. 8 and 9, where like reference numerals represent like elements. In the version illustrated in FIG. 8, side panels 220 and 240 have been extended downwardly under lower panel 200 and include adhesive 340. Additional line of perforations 290 separate the lower panel from this extension. In this manner, the adhesive on side panels 220, 240 and the extension under lower panel 200 combine to form a U-shaped ring of label ply about three of the four sides of label 120 when secured to a substrate. Additionally, an optional strip 400 of label ply 120 extends from upper panel 160 and is connected thereto along transverse line of perforations 420. Strip 400 may contain printed information such as returned goods instructions for a customer which may be torn from upper panel 160 and retained.

In the version illustrated in FIG. 9, lower portion 195 of center panel 180 includes a die cut tab 440. Preferably, the second side of the table in contact with liner ply 140 includes an adhesive thereon such that when the upper panel and upper portion 190 of center panel 180 are folded, tab 440 will be secured to the underlying package surface to seal the fourth side of the label construction to the package. Optionally, tab 440 may include a transverse line of perforations (not shown) which aid the recipient in removing the label from the package.

Figure 10:
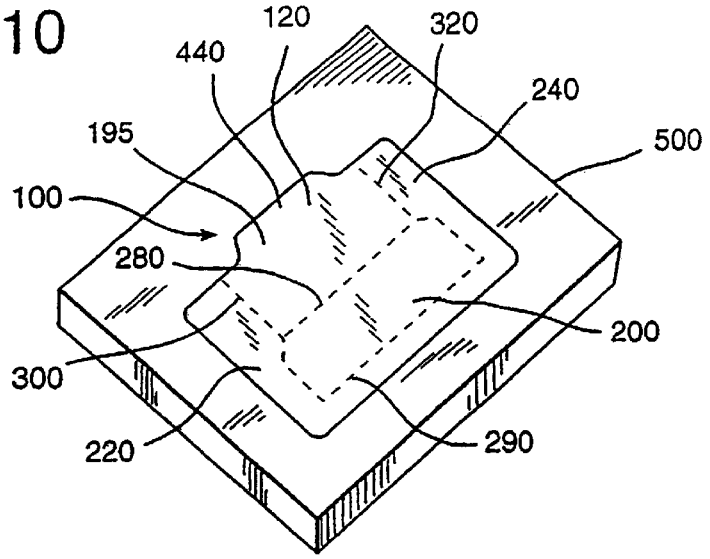
FIG. 10 is a perspective view of a shipping package with the multipurpose tuck label of FIG. 9 attached thereto.
Figure 11:
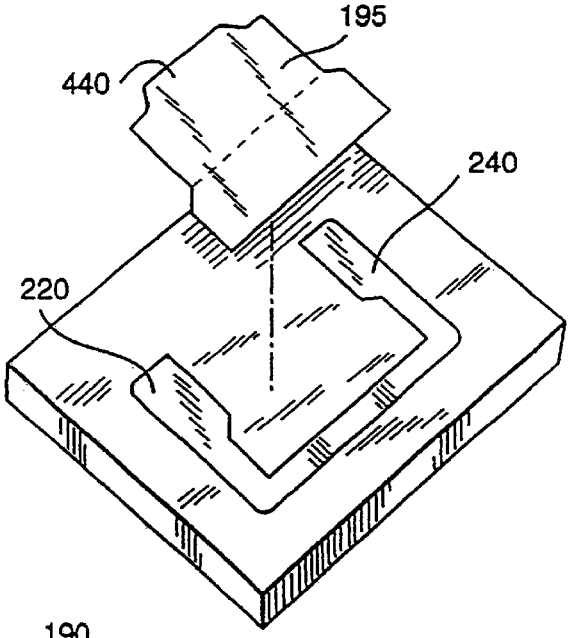
FIG. 11 is a perspective view of the receipt and return label portion of the multipurpose tuck label of FIGS. 9 and 10 removed from the package.
Figure 12:
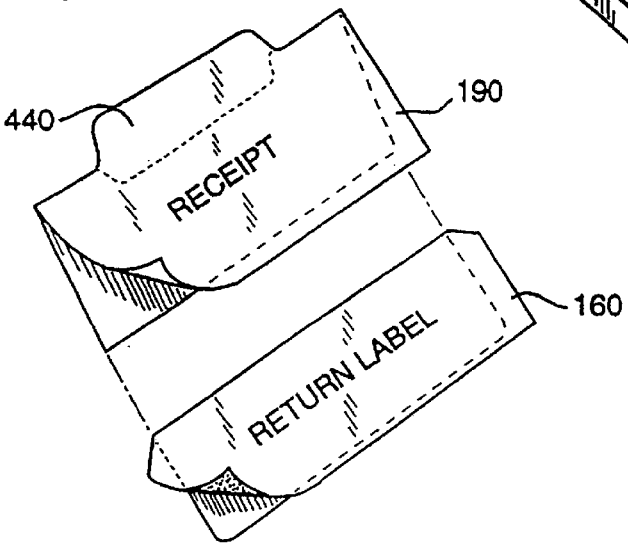
FIG. 12 is a perspective view of the opposite side of the receipt and return label portion of the multipurpose tuck label of FIG. 11.

FIGS. 10–12 illustrate one use of the tuck label 100 of FIG. 9. Liner ply 140 is peeled away from label ply 120, and upper panel 160 and the upper portion 190 of center panel 180 are folded over against the respective lower portions of the label. Then, the folded label is secured to a package 500 using the adhesive carried on the underside of the side panels and their lower extension. Upon receipt, a customer can grasp tab 440 and tear downwardly along lines of perforation 300, 320 and then across transverse line of perforation 280 to remove the upper, center, and lower panels from the remainder of the label construction as shown in FIG. 11.

As illustrated in FIG. 12, the customer is thus provided with a receipt and a return goods label with instructions for returning defective products. Because of the release coating on the second side of lower panel 200, the return label may be readily peeled away and re-adhered to the package for return shipment.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A multipurpose tuck label/form in combination with an article comprising:

an article, and a tuck label/form secured to a surface of said article, said label/form comprising a label ply having first and second sides, said label ply including an upper panel, a center panel, a lower panel, and a pair of side panels; said upper and center panels being connected along a transverse perforated fold line, along which fold line said second side of said upper panel is folded to be in contact with said second side of said center panel, said center panel being connected to said lower panel and to respective side panels along generally transverse and vertical liens of perforation, said side panels including an adhesive on the respective second sides thereof securing said label to said article.

2. The multipurpose tuck label/form of claim 1 including an adhesive positioned adjacent to the upper edge of said second side of said upper panel.

3. The multipurpose tuck label/form of claim 1 in which said label ply includes an additional portion carried on said liner ply adjacent the remainder of said label ply but separated therefrom by at least one die cut.

4. The multipurpose tuck label/form of claim 1 in which said adhesive is a removable or permanent pressure sensitive adhesive.

5. The multipurpose tuck label/form of claim 1 including a self-contained carbonless imaging coating on said first side of said liner ply.

6. The multipurpose tuck label/form of claim 1 including carbonless imaging coatings on said second side of said label ply and said first side of said liner ply such that upon the application of an imaging force, the coatings combine and an image is formed on said liner ply.

7. The multipurpose tuck label/form of claim 1 including an adhesive-free clean lifting edge on said label ply for removing said label ply from said liner ply.

8. A multipurpose tuck label/form comprising in combination:

a label ply having first and second sides, said label ply including an upper panel, a center panel having upper and lower portions connected along a transverse line of perforations, a lower panel, and a pair of side panels; said upper and center panels being connected to one another along a transverse line of perforations; said center panel being connected to said lower panel and to respective side panels along generally transverse and vertical lines of perforation such that said upper, center and lower panels may be removed from said label by tearing along those perforations; the second side of said lower panel including a release coating thereon; said upper and side panels including an adhesive on the respective second sides thereof, with said upper panel and upper portion of said center panel being adapted to be folded along said transverse lines of perforation between said upper and lower portions of said center panel so that said upper panel is in contact with said second side of said lower panel having said release coating and said upper portion of said center panel is in contact with said lower portion of said center panel, respectively; and a liner ply having first and second sides, said first said of said liner ply contacting said second side of said label ply and including a release coating thereon.

9. The multipurpose tuck label/form of claim 8 including an additional panel of said label ply connected to said lower panel along a transverse line of perforations, said additional panel including an adhesive on a second side thereof.

10. The multipurpose tuck label/form of claim 8 in which said lower portion of said center panel includes a die cut tab adjacent said upper portion of said center panel.

11. The multipurpose tuck label/form of claim 10 including adhesive on a second side of said die cut tab.

12. The multipurpose tuck label/form of claim 11 including a generally transverse line of perforation connecting said die cut tab to said lower portion of said center panel.

13. The multipurpose tuck label/form of claim 8 in which said label ply includes an additional portion carried on said liner ply adjacent the remainder of said label ply but separated therefrom by at least one die cut.

14. The multipurpose tuck label/form of claim 8 in which said adhesive is a removable or permanent pressure sensitive adhesive.

15. The multipurpose tuck label/form of claim 8 including a self-contained carbonless imaging coating on said first side of said liner ply.

16. The multipurpose tuck label/form of claim 8 including carbonless imaging coatings on said second side of said label ply and said first side of said liner ply such that upon the application of an imaging force, the coatings combine and an image is formed on said liner ply.

17. The multipurpose tuck label/form of claim 8 including an adhesive-free clean lifting edge on said label ply for removing said label ply from said liner ply.

18. The multipurpose tuck label/form of claim 8 including an address printed said first side of said lower portion of said center panel and a shipper's bar code printed on said first of said lower panel.

19. The multipurpose tuck label/form of claim 8 including a customer receipt printed on said first side of said upper portion of said center panel and a return shipping label printed on said first side of said upper panel.

20. A multipurpose tuck label/form in combination with an article comprising:

an article; and a label secured to a surface of said article, said label having first and second sides and including an upper panel, a center panel having upper and lower portions connected along a transverse line of perforations, a lower panel, and a pair of side panels; said upper and center panels being connected to one another along a transverse line of perforations; said center panel being connected to said lower panel and to respective side panels along generally transverse and vertical lines of perforation such that said upper, center and lower panels may be removed from said label by tearing along those perforations; the second side of said lower said panel including a release coating thereon; said upper and side panels including an adhesive on the respective second sides thereof securing said label to said article, with said upper panel and upper portion of said center panel folded along said transverse lines of perforation so that said second side of said upper panel is in contact with said second side of said lower panel having said release coating and said upper portion of said center panel is in contact with said lower portion of said center panel, respectively.

*21. A multipurpose tuck label/form in combination with an article comprising:*

*an article, and*

*a tuck label/form secured to a surface of said article, said tuck label/form comprising a label ply having a top edge and a bottom edge and first and second sides, said label ply including at least two panels, a first panel of said at least two panels and a second panel of said at least two panels being connected along a transverse perforated fold line, along which a fold line of said second side of said first panel is folded to be in contact with said second side of said second panel, said second panel extending from a top edge of said second panel at said transverse perforated fold line to a bottom edge of said second panel and being connected to a pair of respective side panels along generally vertical lines of perforation extending substantially from said transverse perforated fold line between said first and second panels to said bottom edge of said second panel, said side panels including an adhesive on the respective second sides thereof securing said label to said article.*

*22. The multipurpose tuck label/form of claim 21 including an adhesive positioned adjacent to the upper edge of said second side of said first panel.*

*23. The multipurpose tuck label/form of claim 21 in which said adhesive is a removable or permanent pressure sensitive adhesive.*

*24. A multipurpose tuck label/form in combination with an article comprising:*

*an article, and*

*a tuck label/form secured to a surface of said article, said tuck label/form comprising a label ply having a top edge and a bottom edge and first and second sides, said label ply including at least two panels, a first panel of said at least two panels and a second panel of said at least two panels being connected along a transverse perforated fold line, along which a fold line of said second side of said first panel is folded to be in contact with said second side of said second panel and along which fold line said first side of said first panel is folded to be in contact with said article, said second panel extending from a top edge of said second panel at said transverse perforated fold line to a bottom edge of said second panel and being connected to a pair of respective side panels along generally vertical lines of perforation extending substantially from said transverse perforated fold line between said first and second panels to said bottom edge of said second panel, said side panels including an adhesive on the respective second sides thereof securing said label to said article.*

*25. A multipurpose tuck label/form in combination with an article comprising:*

*an article, and*

*a tuck label/form secured to a surface of said article, said tuck label/form comprising a label ply having first and second sides, said label ply including at least two panels, a first panel of said at least two panels and a second panel of said at least two panels being connected along a transverse perforated fold line, along which fold line said second side of said first panel is folded to be in contact with said second side of said second panel, said second panel extending from a top edge of said second panel at said transverse perforated fold line to a bottom edge of said second panel and being connected to a pair of respective side panels along generally vertical lines of perforation extending substantially the entire length of said second panel from said top edge of said second panel to said bottom edge of said second panel, said side panels including an adhesive on the respective second sides thereof securing said label to said article.*

*26. A multipurpose tuck label/form in combination with an article comprising:*

*an article, and*

*a tuck label/form secured to a surface of said article, said tuck label/form comprising a label ply having first and second sides, said label ply including at least two panels, a first panel of said at least two panels and a second panel of said at least two panels being connected along a transverse perforated a fold line, along which fold line of said second side of said first panel is folded to be in contact with said second side of said second panel and along which fold line said first side of said first panel is folded to be in contact with said article, said second panel extending from a top edge of said second panel at said transverse perforated fold line to a bottom edge of said second panel and being connected to a pair of respective side panels along generally vertical lines of perforation extending substantially the entire length of said second panel from said top edge of said second panel to said bottom edge of said second panel, said side panels including an adhesive on the respective second sides thereof securing said label to said article.*

* * * * *

UNITED STATES PATENT AND TRADEMARK OFFICE

CERTIFICATE OF CORRECTION

PATENT NO. : RE 37,521 E
DATED : January 22, 2002
INVENTOR(S) : Laurash et al.

It is certified that error appears in the above-identified patent and that said Letters Patent is hereby corrected as shown below:

Column 7,
Line 60, patent reads "second side of the table in contact" should read -- second side of the tab in contact --

Column 8,
Line 39, patent reads "vertical liens of perforation," should read -- vertical lines of perforation, --

Column 9,
Line 54, patent reads "on said first of said lower panel" should read -- on said first side of said lower panel --

Column 10,
Line 8, patent reads "said lower said panel including" should read -- said lower panel including --

Signed and Sealed this

Twenty-first Day of May, 2002

*Attest:*

*Attesting Officer*

JAMES E. ROGAN
*Director of the United States Patent and Trademark Office*